US008595316B2

(12) United States Patent
May et al.

(10) Patent No.: US 8,595,316 B2
(45) Date of Patent: Nov. 26, 2013

(54) METHOD AND APPARATUS FOR MANAGING SHARED DATA AT A PORTABLE ELECTRONIC DEVICE OF A FIRST ENTITY

(75) Inventors: Darrell Reginald May, Waterloo (CA); Lap Luu, Markham (CA); Barry Linkert, Petersberg (CA)

(73) Assignee: Blackberry Limited, Waterloo, ON (CA)

( * ) Notice: Subject to any disclaimer, the term of this patent is extended or adjusted under 35 U.S.C. 154(b) by 0 days.

(21) Appl. No.: 13/615,687

(22) Filed: Sep. 14, 2012

(65) Prior Publication Data
US 2013/0007189 A1 Jan. 3, 2013

Related U.S. Application Data

(63) Continuation of application No. 13/300,810, filed on Nov. 21, 2011, now Pat. No. 8,296,387, which is a continuation of application No. 12/908,106, filed on Oct. 20, 2010, now Pat. No. 8,086,689, which is a continuation of application No. 11/450,353, filed on Jun. 12, 2006, now Pat. No. 7,861,005.

(51) Int. Cl.
*G06F 15/16* (2006.01)
(52) U.S. Cl.
USPC .......................................... 709/213; 709/224
(58) Field of Classification Search
USPC ............... 709/200–203, 213–227, 228, 229
See application file for complete search history.

(56) References Cited

U.S. PATENT DOCUMENTS

| | | | | |
|---|---|---|---|---|
| 6,882,659 B1 * | 4/2005 | Novak et al. | .................. | 370/466 |
| 7,224,491 B2 * | 5/2007 | Shinchi et al. | ................ | 358/400 |
| 7,480,853 B2 * | 1/2009 | Flanagin et al. | ............. | 714/798 |
| 7,590,413 B2 * | 9/2009 | May | ........................... | 455/414.1 |
| 7,606,598 B2 * | 10/2009 | Kuhl et al. | ..................... | 455/564 |
| 7,660,831 B2 * | 2/2010 | Freedman | ..................... | 707/621 |
| 7,660,904 B2 * | 2/2010 | Qureshi et al. | ................ | 709/229 |
| 7,668,775 B2 * | 2/2010 | Lu | .................................. | 705/37 |
| 7,668,900 B2 * | 2/2010 | Fishman et al. | ............. | 709/203 |
| 7,710,984 B2 * | 5/2010 | Dunk | ........................... | 370/400 |
| 7,822,713 B2 * | 10/2010 | Hullot et al. | ................. | 707/628 |
| 7,840,210 B2 * | 11/2010 | May | ........................... | 455/414.1 |
| 8,107,483 B2 * | 1/2012 | Dunk | ........................... | 370/400 |
| 8,160,649 B2 * | 4/2012 | Kuhl et al. | ..................... | 455/564 |

(Continued)

OTHER PUBLICATIONS

May et al., "Method and Apparatus for Managing Shared Data at a Portable Electronic Device of a First Entity"; U.S. Appl. No. 11/450,353, filed Jun. 12, 2006.

(Continued)

*Primary Examiner* — Moustafa M Meky
(74) *Attorney, Agent, or Firm* — Perry + Currier

(57) ABSTRACT

A method and apparatus for managing shared data at a portable electronic device of a first entity is provided. A message is received advising that data associated with a second entity is being shared. A request is transmitted to a server for a list of shared folders associated with the second entity, in response to an option to view shared folders associated with the second entity being selected. The list is received. An initialize command is transmitted to the server, the initialize command identifying at least one folder in the list. The data associated with the second entity is received, responsive to the transmitting the initialize command. The data is stored in association with a second entity identifier.

17 Claims, 11 Drawing Sheets

(56) References Cited

U.S. PATENT DOCUMENTS

| | | | |
|---|---|---|---|
| 8,260,847 B2* | 9/2012 | Fishman et al. | 709/203 |
| 2004/0078256 A1* | 4/2004 | Glitho et al. | 705/8 |
| 2006/0190313 A1* | 8/2006 | Lu | 705/8 |
| 2012/0290954 A1* | 11/2012 | Qureshi et al. | 715/758 |
| 2013/0097495 A1* | 4/2013 | Lu | 715/277 |
| 2013/0097496 A1* | 4/2013 | Lu | 715/277 |

OTHER PUBLICATIONS

May et al., "Method and Apparatus for Managing Shared Data at a Portable Electronic Device of a First Entity"; U.S. Appl. No. 12/908,106, filed Oct. 20, 2010.

May et al., "Method and Apparatus for Managing Shared Data at a Portable Electronic Device of a First Entity"; U.S. Appl. No. 13/300,810, filed Nov. 21, 2011.

\* cited by examiner

Address Book

Andrews, Alison
Bell, John
Davis, Jim
Elliot, William
Graham, Richard
Hollins, Greg
Johnson, Robert
Kelly, Reid

FIG. 7A

Address Book

Johnson, Robert
500 King Street
Toronton, ON
X1Y 2Z3
Telephone 416-555-5555
Facsimile 416-555-5556
E-mail: robert.johnson@home.com View Shared Folders For This User

FIG. 7B

METHOD AND APPARATUS FOR MANAGING SHARED DATA AT A PORTABLE ELECTRONIC DEVICE OF A FIRST ENTITY

CROSS-REFERENCE TO RELATED APPLICATIONS

The present application is a continuation of and claims priority from U.S. patent application Ser. No. 13/300,810 filed Nov. 21, 2011 which is a continuation of and claims priority from U.S. application Ser. No. 12/908,106 filed on Oct. 20, 2010 (U.S. Pat. No. 8,086,689) which is a continuation of and claims priority from U.S. patent application Ser. No. 11/450,353 filed on Jun. 12, 2006 (U.S. Pat. No. 7,861,005), the contents being incorporated herein by reference.

FIELD

The present application relates to portable electronic devices and to a method and apparatus for managing shared data at a portable electronic device of a first entity.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, EDGE, UMTS AND W-CDMA networks.

These portable electronic devices commonly include databases for storing data that is selectably retrievable by a user of a device. The databases include, for example, an exchange database including a user's personal Contacts, Tasks, Memo's, Calendar and electronic mail. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices, to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices also provide for back-up of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Data that is stored in a database at a computing station can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. When a data record on a computing station does not exist on the portable electronic device, or when the content of the data record (the fields of the data record) of the computing station differs from the content of the data record of the portable electronic device, then the additional data record or differing data record is transferred to the portable electronic device. Similarly, when a data record on a portable electronic device does not exist on the computing station, or when the content of the data record of the portable electronic device differs from the content of the data record of the computing station, the additional data record or differing data record is transferred to the computing station. When a data record is deleted from the portable electronic device, a delete data record indication is sent from the portable electronic device to the computing station in order to delete the corresponding data record at the computing station.

Such portable electronic devices suffer from the disadvantage that these devices support only one group of each of Address book, Tasks, Memo Pad and Calendar. Thus, only a single folder of Contacts is stored on the device. Similarly, single folders of each of Tasks, Memo's and Calendar are stored on the device.

BRIEF DESCRIPTION OF THE DRAWINGS

The method and apparatus for sharing data be better understood with reference to the following description and to the Figures, in which:

FIGS. 7A to 7C are screens of the LCD display output device of the portable electronic device, displayed when the functions illustrated in FIG. 6 are carried out;

DETAILED DESCRIPTION OF THE EMBODIMENT

Figure 1:
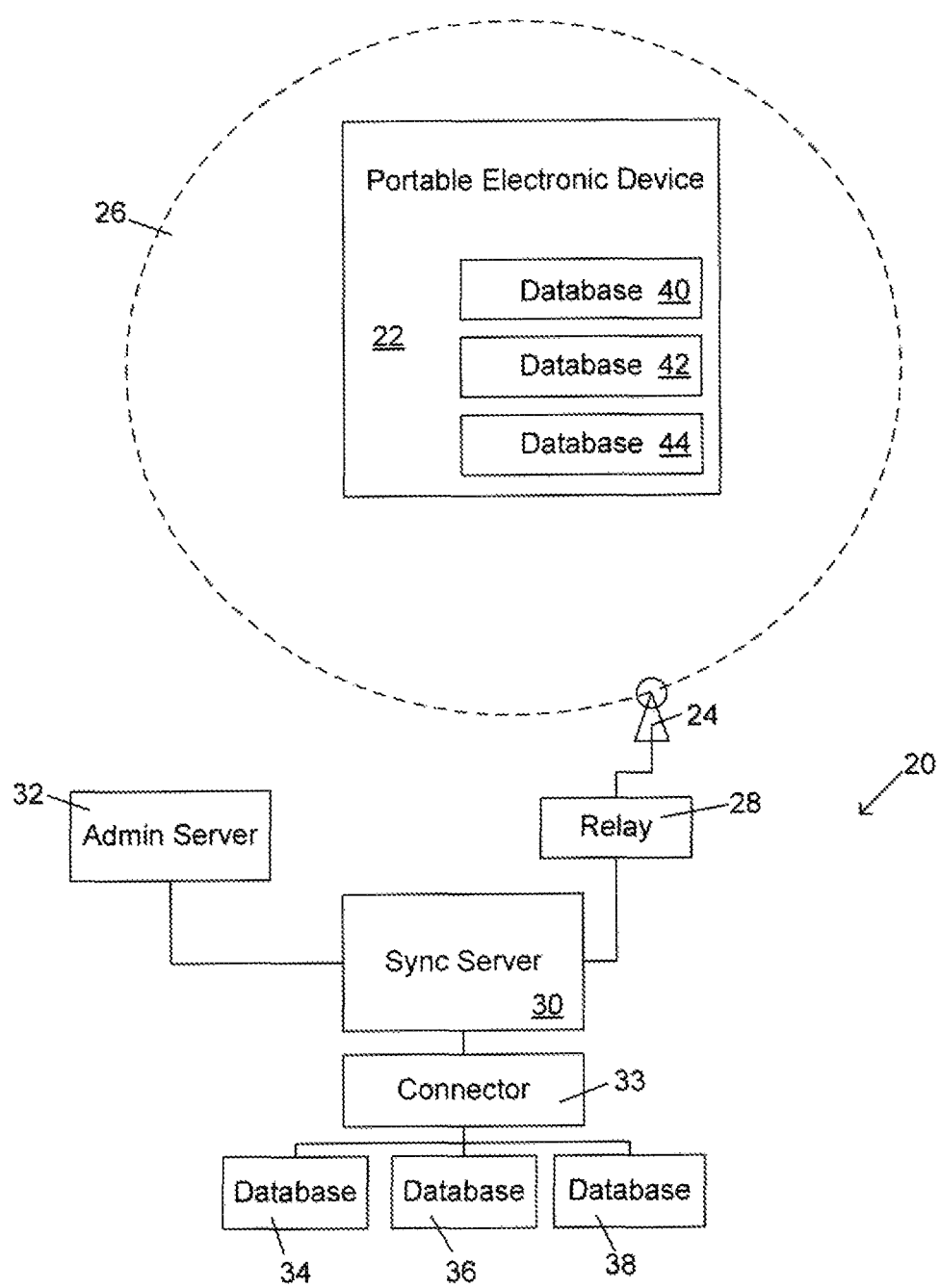
FIG. 1 is a functional block diagram of a radio communication system including a portable electronic device and a communication system having a synchronization server according to one embodiment of the present application.

An aspect of the specification provides a method of managing shared data at a portable electronic device of a first entity, the method comprising: receiving a message advising that data associated with a second entity is being shared; transmitting a request to a server for a list of shared folders associated with the second entity, in response to an option to view shared folders associated with the second entity being selected; receiving the list; transmitting an initialize command to the server, the initialize command identifying at least one folder in the list; receiving the data associated with the second entity, responsive to the transmitting the initialize command; and storing the data in association with a second entity identifier.

At the portable electronic device, the data can be stored in a folder identified with the second entity identifier.

The method can further comprise: displaying options for viewing one of the data saved in association with the second entity identifier and other data saved in association with the other entity identifier.

Storing the data can comprise storing the data with read-only access, thereby allowing only viewing of the data upon selection of the data on the electronic device.

Storing the data can comprise storing the data with read and write access, thereby allowing modification of the data.

A further aspect of the specification provides a portable electronic device of a first entity, the device comprising: a receiver enabled to: receive a message advising that data associated with the second entity has been made available; transmit a request to a server for a list of shared folders associated with the second entity, in response to an option to view shared folders associated with the second entity being selected; receive the list; transmit an initialize command to the server, the initialize command identifying at least one folder in the list; and, in response, receive the data associated with the second entity. The device further comprises: a memory device enabled to store the data; and a processor connected to the memory device, the processor enabled to store the data in association with a second entity identifier.

The data can be stored in a folder identified with the second entity identifier.

The portable electronic device can further comprise a display device enabled to display option for viewing one of the data saved in association with the second entity identifier and other data saved in association with the other entity identifier.

The memory device can store the data with read-only access, thereby allowing only viewing of the data upon selection of the data on the electronic device.

The memory device can store the data with read and write access, thereby allowing modification of the data.

The option to view the shared folders associated with the second entity can be provided with contact details of the second entity.

Another aspect of the specification provides a computer program product, comprising a computer usable medium having a computer readable program code adapted to be executed to implement a method of managing shared data at a portable electronic device of a first entity, the method comprising: receiving a message advising that data associated with a second entity is being shared; transmitting a request to a server for a list of shared folders associated with the second entity, in response to an option to view shared folders associated with the second entity being selected; receiving the list; transmitting an initialize command to the server, the initialize command identifying at least one folder in the list; receiving the data associated with the second entity, responsive to the transmitting the initialize command; and storing the data in association with a second entity identifier.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect over-the-air communications therebetween via a radio communications channel. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communication system 20 is functionally represented in FIG. 1 and a single base station 24 is shown. The base station 24 defines a coverage area, or cell 26 within which communications between the base station 24 and the portable electronic device 22 can be effected. It will be appreciated that the portable electronic device 22 is movable within the cell 26 and can be moved to coverage areas defined by other cells that are not illustrated in the present example. The communication system 20 includes a relay device 28 that is connected to the base station 24 and to a synchronization server 30. It will be understood that the functions provided by the relay device 28 and the synchronization server 30 can be embodied in the same device. The synchronization server 30 is connected to an administration server 32, as shown. The administration server 32 provides administrative services to the communication system 20 and, for instance, provides administrative control over the synchronization server 30.

The synchronization server 30 is also functionally coupled through a personal information management connector 33 to databases, of which, three exemplary database types including a first database 34, a second database 36 and a third database 38, are shown. The personal information management connector 33 interfaces between the synchronization server 30 and the databases 34, 36, 38. It will be understood that the personal information management connector 33 is a functional component and can be provided by way of an application on the synchronization server 30. The databases of the present example are of a text format such as an Extensible Mark-up Language (XML) format. Each database to which a user has access, is connected through the personal information management connector 33. The data maintained in the first, second and third databases 34, 36, 38, includes a number of data records as further described below, each data record containing a plurality of fields that are populated with data.

The portable electronic device 22, of which only particular functional portions are shown in FIG. 1 for the purposes of the present description, includes a plurality of databases 40, 42, 44 that correspond to the first, second and third databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
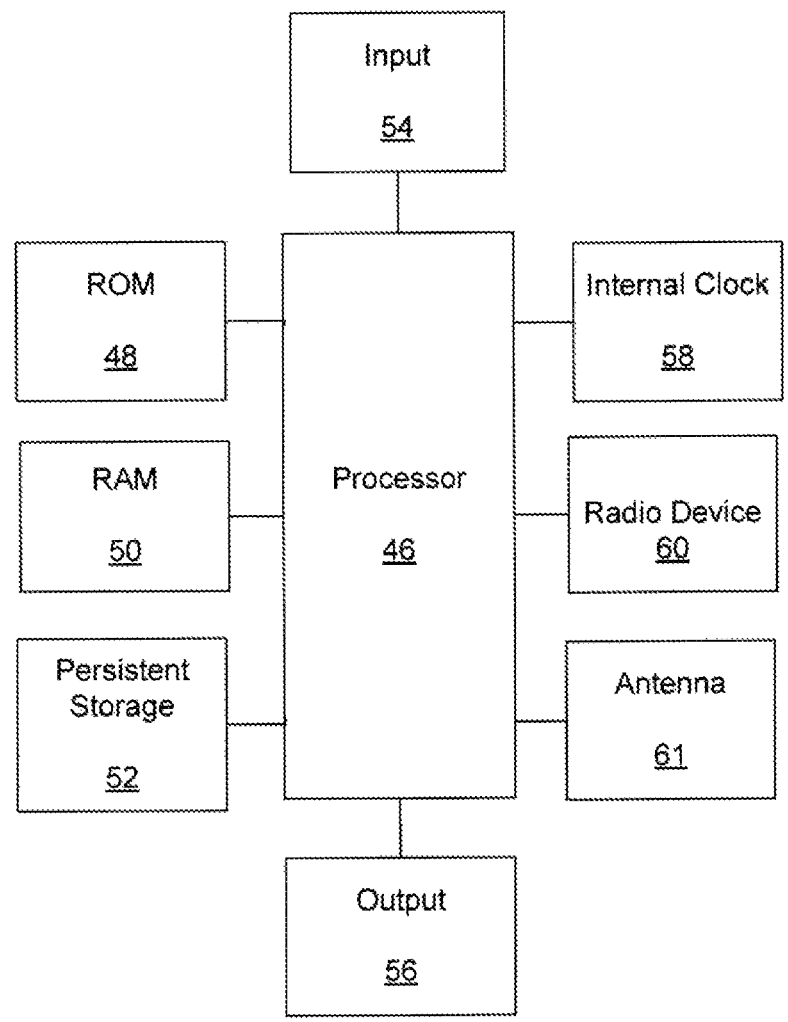
FIG. 2 is a block diagram of certain internal components within the portable electronic device of FIG. 1.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. The processor 46 is also connected to a random access memory unit (RAM) 50 and a persistent storage device 52 which are responsible for various non-volatile storage functions of the portable electronic device 22 and in which the databases 40, 42, 44 are maintained. The processor 46 receives input from input devices 54 such as a keyboard. The processor 46 outputs to output devices 56 such as an LCD display. The processor 36 is also connected to an internal clock 58 and a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

Figure 3:
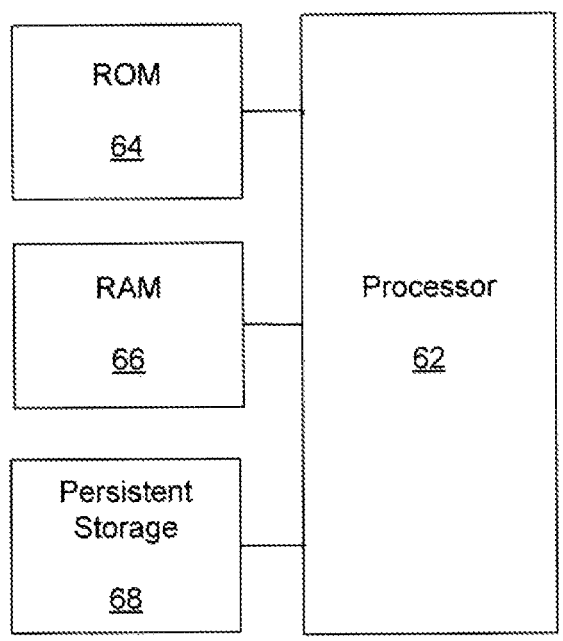
FIG. 3 is a block diagram of certain internal components within the synchronization server of FIG. 1.

Reference is now made to FIG. 3 which shows a block diagram of certain internal components within the synchronization server 30. Similar to the portable electronic device 22, the synchronization server 30 includes a processor 62 connected to a read-only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is functionally connected to the databases 34, 36, 38 through the personal information management connector 33 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Figure 4:
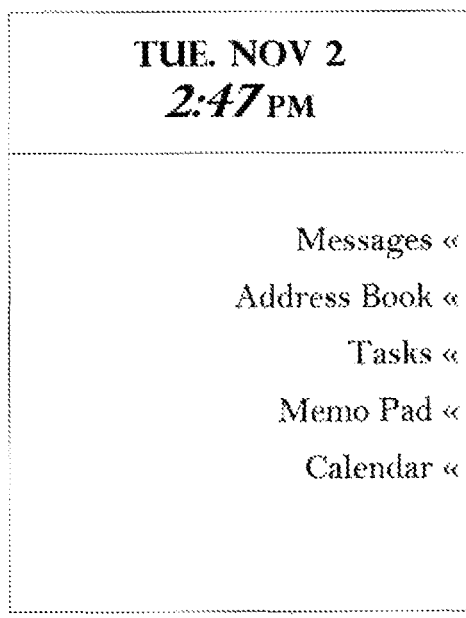
FIG. 4 is a screen of an LCD display output device of the portable electronic device of FIG. 2.

Reference is now made to FIG. 4 which shows an exemplary menu screen that is displayed on the LCD display output device 56 of the portable electronic device 22. The portable electronic device 22 is operable to execute various applications stored in the ROM 48. Such applications include, for example, a message reader (Messages), an Address Book, a task list (Tasks), a Memo Pad and a Calendar, as shown in the exemplary menu screen of FIG. 4. The input devices 54 are used for selecting a desired application to be executed and to exit the application when desired. When executed by the processor 46, each application causes the portable electronic device 22 to operate in a specific manner.

It will be appreciated that e-mails are received on the portable electronic device 22 from the communication system 20 over a radio communications channel. Each e-mail includes a variety of information including identification information identifying the folder to which the e-mail belongs for viewing. To view an e-mail, the Messages application is selected from the menu screen by using the input devices 54, causing execution of the application by the processor 46.

The Address Book application is used for storing electronic contact records including addresses, telephone and facsimile numbers and e-mail addresses. The contact records are created and viewed by selecting the Address Book application on the menu screen, thereby causing execution of the application by the processor 46.

The Tasks application is used for storing a list of tasks to be completed. The tasks are added, edited, deleted and viewed by selecting the Task List application causing execution of the application by the processor 46.

The Memo Pad application is used for storing memos which are added, edited, deleted and viewed by selecting the Memo Pad application causing execution of the application by the processor 46.

The Calendar application is used for displaying and storing calendared events such as appointments, meetings, dinners, etc., when executed by the processor 46. Each calendared event includes a variety of information including a date, time and note regarding the event.

The portable electronic device 22 is provided with each of these various applications for use by a user of the portable electronic device 22. Each of the e-mails, contact records, tasks, memos, and calendared events are stored as data records in one of the databases 40, 42, 44 of the portable electronic device 22. As indicated above, the corresponding database 34, 36, 38 of the communication system 20 includes corresponding data records stored therein. In the present application, each of the data records for each of the applications includes an extension that provides a unique identification, thereby identifying the data record as belonging to a particular folder (Messages, Address Book, Tasks, Memo Pad or Calendar). For each of the data records of the applications, the extension also provides an identification of the data source, referred to herein as the data source identification. The data source for the user's personal Messages, Address Book, Tasks, Memo Pad and Calendar data records is identified as originating from the portable electronic device 22 of that particular user. Each subscriber has their own unique data source identification. Thus, for a first subscriber, the unique identification for each of the personal data records of the Calendar application identifies those data records as belonging to the Calendar folder and as originating from the first subscriber. Similarly, each of the personal data records of the Address Book application (contact records) identify those data records as belonging to an Address Book folder and as originating from the first subscriber.

Figure 5:
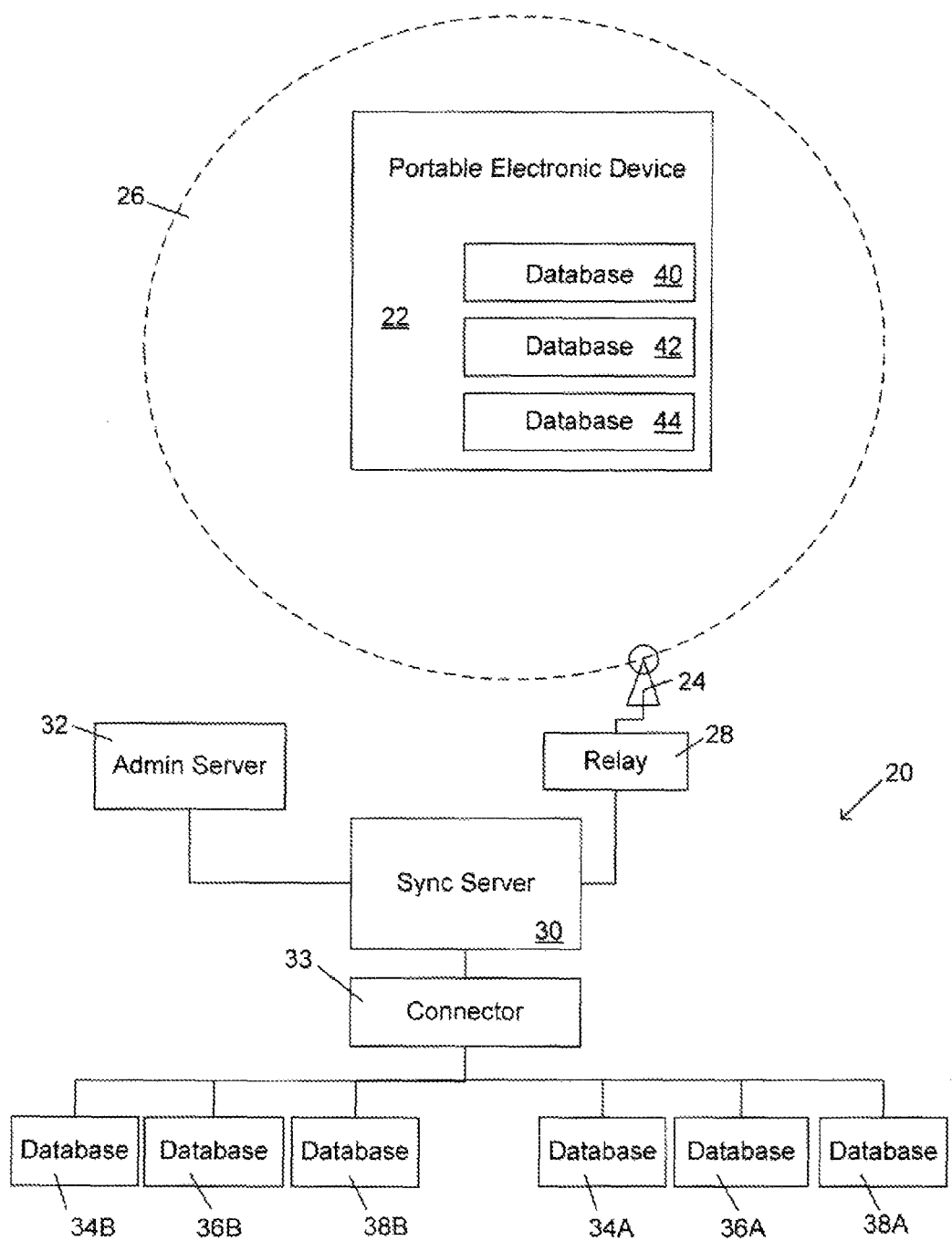
FIG. 5 is a functional block diagram similar to FIG. 1, showing a radio communication system including a portable electronic device and a communication system, the communication system including two personal information management connectors and respective databases.

To illustrate one particular example of an embodiment of the system and method of subscribable folder synchronization and management, reference is now made to FIG. 5 which shows a functional block diagram of the radio communication system 20 and the portable electronic device 22, similar to that shown in FIG. 1. In FIG. 5, however, the personal information management connector 33 is connected to two sets of databases. As in FIG. 1, the personal information management connector 33 is shown connected to three exemplary databases 34A, 36A, 38A associated with one subscriber. In FIG. 5, however, the personal information management connector 33 is also shown connected to three further exemplary databases 34B, 36B, 38B associated with a second subscriber. The personal information management connector 33 and the two sets of databases are for management and storage of data records. Thus, the databases 34A, 36A, 38A include data records associated with a first subscriber and the databases 34B, 36B, 38B include data records associated with a second subscriber. It will be understood that only two subscribers are shown for the purpose of the present example and further subscribers are possible.

In the present example, only a single portable electronic device 22 is shown, the portable electronic device 22 belonging to the first subscriber and having databases 40, 42, 44 that correspond to the databases 34A, 36A, 38A. It will be understood that a second portable electronic device could be shown with databases corresponding to the databases 34B, 36B and 38B. Still further portable electronic devices are possible for additional subscribers. For the purpose of simplicity, however, only a single portable electronic device 22 is shown.

Figure 6:
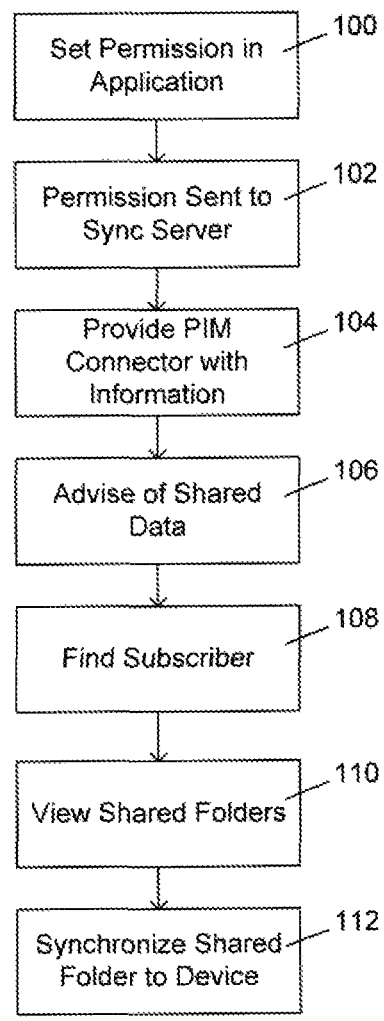
FIG. 6 is a flowchart illustrating functions carried out in one embodiment of the method of sharing data.

Referring now to FIG. 6, a flowchart illustrating functions carried out in one embodiment of the method of folder management and synchronization is shown. Coding of software for carrying out the steps shown and described below is well within the scope of a person of ordinary skill in the art. The second subscriber having data records that are stored in databases on a portable electronic device and corresponding databases 34B, 36B, 38B at the communication system 20 in FIG. 5, uses a desktop computer in a desktop client application to set permission to allow the first subscriber to have access to data records of the second subscriber at step 100. For the purpose of the present example, the second subscriber gives permission to allow the first subscriber to have "read-only" access to data records associated with the calendar application. This can be carried out in a number of different ways depending on the desktop application, as will be understood by those skilled in the art. For example, in the Calendar application in Outlook™, an option is provided to "share my calendar". After selecting the "share my calendar" option, a number of further options are provided that are selectable to permit the first subscriber to access the data records of the second subscriber. The first subscriber is identified and options are chosen to permit the first subscriber to read data records only but not permitting the first subscriber to edit, delete or create any data records. In the present example, the second subscriber gives permission to the first subscriber to only access the data records of the second subscriber. Thus, the first subscriber is considered to have delegate access to the calendar data records of the second subscriber. The change in permission is then sent to the synchronization server 30 at step 102.

The personal information management connector 33 monitors the sharing and permissions given for the data records stored on the databases and when the first subscriber is given access to the calendar data records of the second subscriber, the personal information management connector 33 permits access to the one of the databases 34B, 36B, 38B in which the calendar data records are stored. In the example shown in FIG. 5, the first subscriber is given access to the records in three databases and thus, the personal information management connector 33 is connected to all of the databases 34B, 36B, 38B.

When the first subscriber is given access to the calendar data records of the second subscriber, the first subscriber is advised that access to the data records of the second subscriber has been granted at step 106. In the present example, the second subscriber sends an e-mail to the first subscriber to advise that the calendar data records of the second subscriber have been made available to the first subscriber. The e-mail is received by the first subscriber.

Figure 7C:
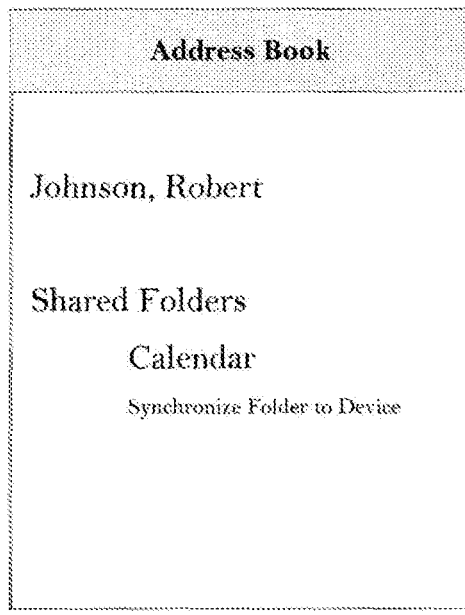

After receipt of the e-mail the first subscriber then looks up the second subscriber using a global address lookup at step 108. For example, the first subscriber selects the Address Book application from the menu screen shown in FIG. 4, on the portable electronic device 22 resulting in the display of the list of Address Book records as shown in FIG. 7A. Next, the first subscriber selects the name from the list of Address Book records that corresponds with the second subscriber (Johnson, Robert in the exemplary screens shown in FIGS. 7A to 7C), resulting in the display of the contact details of the second subscriber as shown in FIG. 7B. The first subscriber then selects an option to "View Shared Folders for this User" at step 110. This option sends a request to the communication system 20 to provide a list of folders of the second subscriber to which the first subscriber has been permitted access. The request is received at the communication system 20 and is passed on to the personal information management connector 33 through the synchronization server 30. A response is provided from the personal information management connector 33 to the synchronization server 30 and through the relay and base station, to the portable electronic device 22. The list of folders that the second subscriber has permitted the first subscriber to access is then displayed on the LCD display output device 56 of the portable electronic device 22, as shown in FIG. 7C. In the present example, the second subscriber (Johnson, Robert) has provided read-only access to the Calendar data records only. Thus, only a Calendar folder is displayed on the LCD display output device 56 of the portable electronic device 22 as being shared.

When the Calendar folder is displayed, a "Synchronize folder to Device" option is also displayed, allowing the first subscriber to select this option to synchronize the Calendar folder of the second subscriber to the portable electronic device 22. The "Synchronize folder to Device" option acts as a synchronization trigger when selected to thereby initiate synchronization between the portable electronic device 22 and the Calendar folder of the second subscriber. The first subscriber can choose not to synchronize the folder to the portable electronic device 22 by not selecting the "Synchronize folder to Device" option.

Figure 8:
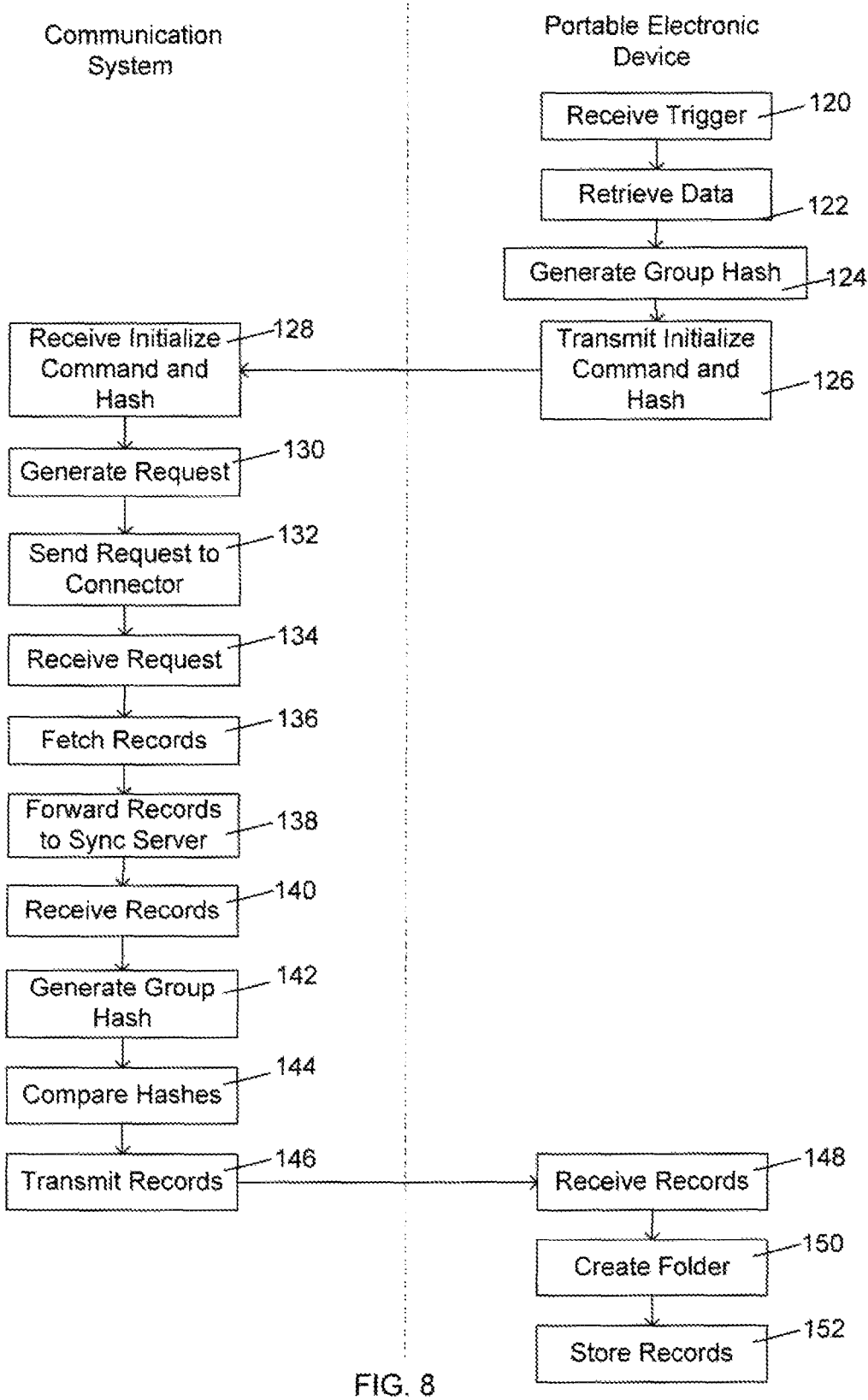
FIG. 8 is a sequence diagram illustrating functions carried out at both the portable electronic device and the communication system of FIG. 1 during a first synchronization of a folder of a database.

Reference is now made to FIG. 8, which shows a flowchart illustrating functions carried out at both the portable electronic device 22 and the communication system 20 during synchronization of the shared Calendar folder of one of the databases associated with the second subscriber with the portable electronic device 22 of the first subscriber. For the purpose of the present example, the Calendar data records are stored on the database 34B. Coding, of software for carrying out such steps is well within the scope of a person of ordinary skill in the art. As shown in FIG. 5, the portable electronic device 22 and the communication system 20 are connected by wireless interface. The portable electronic device 22 receives the synchronization trigger at 120, by selection of the "Synchronize Folder to Device" option shown on the LCD display device 56 and illustrated in FIG. 7C, using the user input on the input device 54. The synchronization process is thereby triggered for records of the database 34B with a database of the portable electronic device 22. In the present example, synchronization is triggered for data to be stored in a folder of the first database 40. In response to receipt of the synchronization trigger, the processor 46 attempts to retrieve data records from the corresponding folder of the database 40 for which synchronization is requested at step 122. The processor 46 generates a record hash for each data record from the folder of the database 40 and then generates a group hash for the folder, based on the individual record hashes at step 124. In the present example, however, no folder is present on the portable electronic device 22 that corresponds with the folder of the database 34B that includes the second subscriber's (Johnson, Robert) Calendar data records. Thus, a null group hash is generated, indicating that no folder or data records exist on the portable electronic device 22, that correspond with the Calendar folder and data records on the database 34B of the communication system 20. Next, an initialize command is transmitted along with the null group hash, from the portable electronic device 22 to the communication system 20 over a radio communication channel, at step 126. The initialize command initiates the synchronization process at the synchronization server 30, identifies the Calendar data records folder of the database 34B for synchronization and provides synchronization session state information including a session state identifier. The portable electronic device 22 then awaits a response from the communication system 20.

The communication system 20 receives the initialize command along with the null group hash indicating that no corresponding folder or data records exist on the portable electronic device 22 at step 128 by receipt at the base station 24. The base station 24 forwards the initialize command and the null group hash to the synchronization server 30. As indicated above, the initialize command identifies the folder of the database for synchronization and provides synchronization session state information including the session state identifier. A synchronization session is thereby started with the portable electronic device 22. In response to receipt of the initialize command, the synchronization server 30 generates a request at step 130 for all data records of the database on the communication system side 20 that belong to the Calendar folder of the database 34B. The request is then sent to the personal information management connector 33 to retrieve the Calendar records of the database 34B at step 132.

The request for all Calendar data records of the Calendar folder belonging to the database 34B is received at the personal information management connector 33 at step 134. The personal information management connector 33 then fetches all calendar data records from the database 34B in accordance with the request, at step 136 and forwards the records to the synchronization server 30 at step 138. It will be appreciated that the personal information management connector 33 is permitted to fetch the calendar data records of the database 34B by the permission set by the second subscriber and received at the personal information management connector 33.

At step 140, the synchronization server receives all of the Calendar data records from the database 34B and generates a record hash for each retrieved data record from the database 34B. The record hashes are referred to herein as the locally generated record hashes. From the locally generated record hashes, a group hash for the Calendar folder from the database 34B is generated at step 142. Thus, the group hash is representative of the data records retrieved from the database 34 and is referred to herein as the locally generated group hash. After generation of the locally generated group hash, the null group hash received from the portable electronic device 22 is compared with the locally generated group hash at step 144. From this comparison, the synchronization server 30 determines that no data records exist on the portable electronic device 22 that correspond with the Calendar data records from the database 34B and the Calendar data records retrieved from the database 34B are sent to the portable electronic device 22 at step 146. Each of these Calendar data records includes the unique identification as described above. In particular, each of the Calendar data records includes an extension identifying those data records as belonging to the Calendar folder and as originating from the second subscriber (Johnson, Robert).

Upon, receipt of the Calendar data records at the portable electronic device 22 of the first subscriber at step 148, a folder is created in the first subscriber's database 40 corresponding to the second subscribers Calendar data records at step 150. Each of the data records received at the portable electronic device is saved in the folder created for the second subscriber's Calendar data records at step 152. It will be appreciated that the Calendar data records received at the portable electronic device 22 at step 148 are distinct from the first subscriber's personal Calendar records and are identified as being distinct by the unique identification. The first subscriber's personal Calendar data records are differentiated from the Calendar data records received from the database 34B, by the data source identification.

The permission set by the second subscriber is carried over to the portable electronic device 22 along with the Calendar data records. Thus, the permission set by the second subscriber to allow "read-only" access to data records is carried over to the portable electronic device 22 along with the Calendar data records received at step 148. The Calendar data records of the second subscriber can therefore only be viewed on the portable electronic device 22. No editing of these Calendar data records by the first subscriber is permitted.

Figure 9:
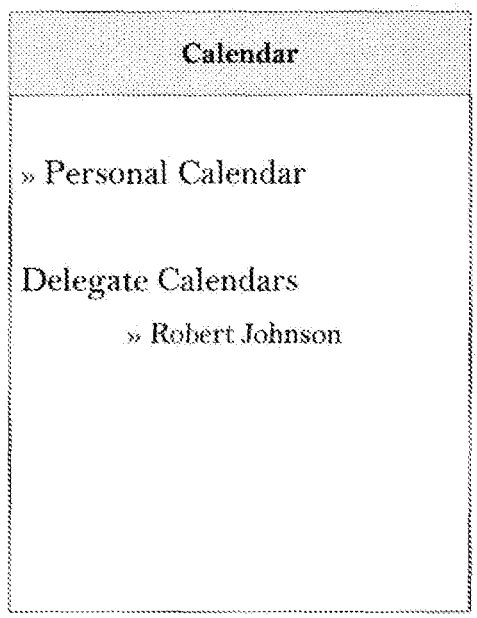
FIG. 9 is a screen of the LCD display output device of the portable electronic device, displayed after synchronization of databases.

Reference is again made to FIG. 4 which shows an exemplary menu screen displayed on the LCD display output device 56 of the portable electronic device. The Calendar data records of the second subscriber are viewed by selecting the Calendar application displayed on the output device 56. After selection of the Calendar application, a submenu is displayed as shown in FIG. 9, providing two different selectable options. One of the two selectable options is a Personal Calendar which, when selected, executes the Calendar application, thereby displaying personal calendared events such as appointments, meetings, dinners, etc. The Personal Calendar option allows for viewing, adding, editing and deleting any of the calendared events. The second of the two selectable options is the second subscriber's calendar (Johnson, Robert) which is listed under the heading "Delegate Calendars" in the exemplary screen illustrated in FIG. 9. When the second subscriber's calendar is selected, the Calendar application is executed, displaying the calendared events of the second subscriber. The first subscriber thereby views the displayed calendared events. Editing, adding or deleting of these events is not permitted, in accordance with the read-only permission granted to the first subscriber.

Figure 10:
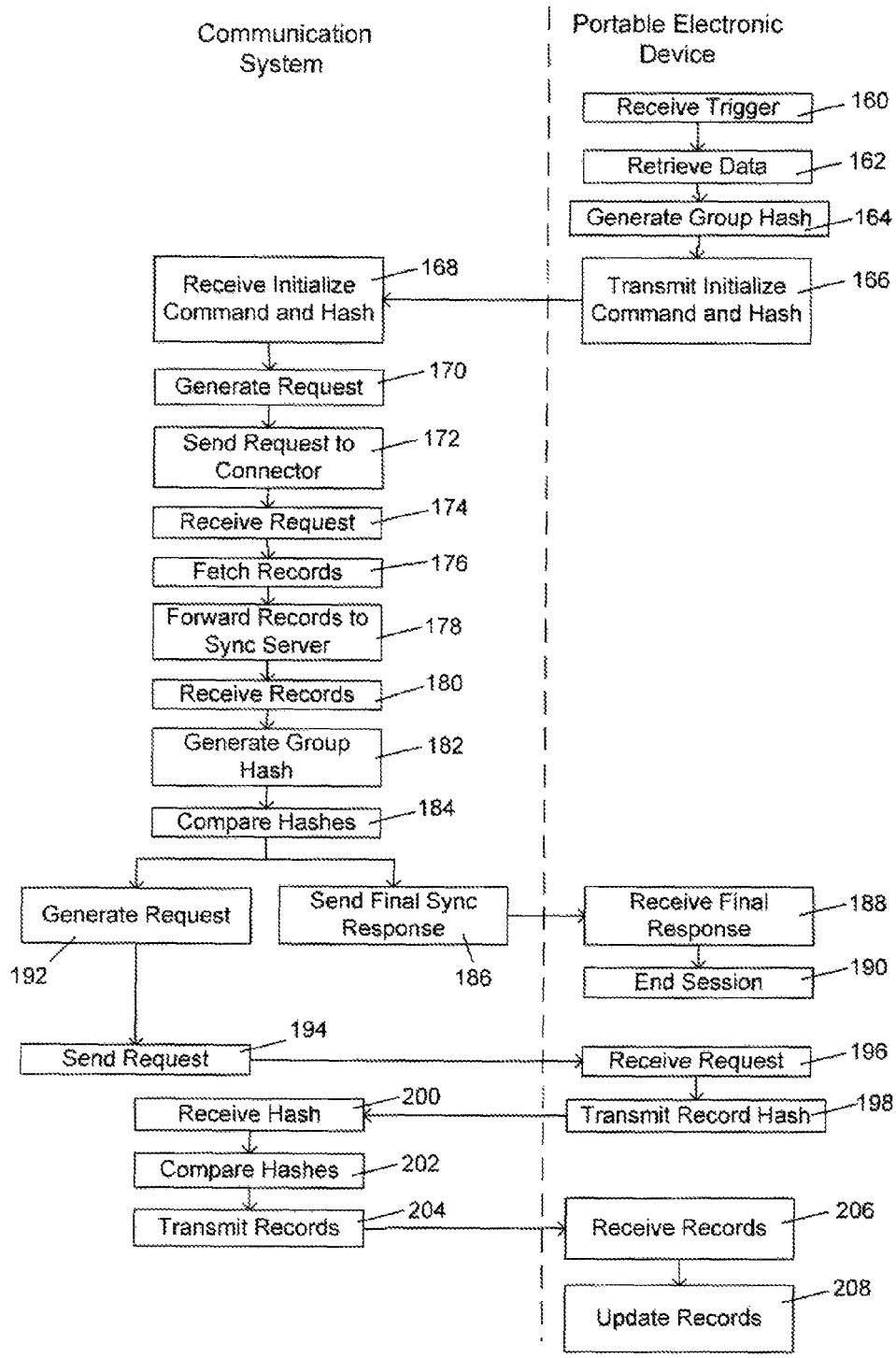
FIG. 10 is a sequence diagram illustrating functions carried out at both the portable electronic device and the communication system of FIG. 1 during further synchronizations.

After the second subscriber's Calendar data records are added to the database 40 of the portable electronic device 22 of the first subscriber, the records can be synchronized at any time by synchronizing the folder in which the second subscribers Calendar data records are stored, with the corresponding folder on the database 34B using a normal synchronization process. Reference is made to FIG. 10 to describe full synchronization of the folder on the portable electronic device 22 with the corresponding folder on the database 34B. Coding of software for carrying out such steps is well within the scope of a person of ordinary skill in the art. The portable electronic device 22 receives a synchronization trigger at step 160, by, for example, selection of a synchronize option on the LCD display device 56, using the user input on the input device 54. In response to receipt of the synchronization trigger, the processor 46 retrieves data records from the folder of the database 40 on which the second subscriber's Calendar data records are stored and for which synchronization is requested, at step 162. The processor 46 generates a record hash for each data record from the folder of the database 40 and then generates a group hash for the folder, based on the individual record hashes at step 164. Next, an initialize command is transmitted along with the group hash, from the portable electronic device 22 to the communication system 20 over a radio communication channel, at step 166. The initialize command initiates the synchronization process at the synchronization server 30, identifies the Calendar data records folder of the database 34B for synchronization and provides synchronization session state information including a session state identifier. The portable electronic device 22 then awaits a response from the communication system 20.

The communication system 20 receives the initialize command along with the group hash at step 168 by receipt at the base station 24. The base station 24 forwards the initialize command and the group hash to the synchronization server 30. As indicated above, the initialize command identifies the database for synchronization and provides synchronization session state information including the session state identifier. A synchronization session is thereby started with the portable electronic device 22. In response to receipt of the initialize command, the synchronization server 30 generates a request at step 170 for all data records of the folder on the database on the communication system side 20 that corresponds with the folder of the database being synchronized on the portable electronic device 22. In the present example, the Calendar data records folder on the database 34B corresponds with the second subscriber's Calendar data records on the database 40 of the portable electronic device 22 and thus, it is the records of the Calendar folder on the database 34B that are requested in the request generated at step 170. The request is then sent to the personal information management connector 33 to retrieve the second subscriber's Calendar data records at step 172. The request for all data records of second subscriber's Calendar folder on the database 34B is received at the personal information management connector 33 at step 174. The personal information management connector 33 then fetches all records from the database 34 in accordance with the request, at step 176 and forwards the records to the synchronization server 30 at step 178. Again, it will be appreciated that the personal information management connector 33 is permitted to fetch the calendar data records of the database 34B by the permission set by the second subscriber and received the personal information management connector 33.

At step 180, the requested data records are received at the synchronization server 30, from the personal information management connector 33. Next, the processor 62 of the synchronization server 30 generates record hashes, each record hash being generated from a corresponding received data record. From the record hashes, a group hash representative of the data records received (referred to herein as the locally generated group hash) is generated at step 182. After generation of the locally generated group hash, the hash information of the group hash received from the portable electronic device 22 is compared with the hash information of the corresponding locally generated group hash at step 184. If the comparison of the hash information indicates that the second subscriber's calendar data records stored in the database 40 on the portable electronic device 22 are not in mismatch with the corresponding Calendar data records stored in the database 34B, then a response is sent to the portable electronic device 22 to terminate the synchronization session at step 186.

The response is received at the portable electronic device 22 at step 188 and the synchronization session is terminated at step 190.

If, on the other hand, the comparison of the hash information indicates that the data records are in mismatch, then the second subscriber's Calendar data records stored in the folder on the database 40 of the portable electronic device 22 are to be updated and a request for additional hash information is generated by the synchronization server 30 at step 192. The request for additional hash information is a request for hash information associated with the individual data records. The additional hash information is requested for each data record of the second subscriber's Calendar folder stored in the folder on the first database 40 of the portable electronic device 22. After generation of the request for additional hash information, the request is then transmitted to the portable electronic device 22 at step 194.

Once the request for additional hash information is received at the portable electronic device 22 at step 196, each data record generated at step 164 is transmitted to the communication system 20 over the radio communication channel at step 198.

The additional hash information is received at the communication system 20 and delivered to the synchronization server 30 at step 200. In response to receipt of the requested additional hash information, each hash generated for each of the data records of the corresponding first database 34B at step 182 is compared with a corresponding one of the hashes received at step 202 and a determination is made as to which of the data records of the folder containing the second subscriber's Calendar data records on the database 40 of the portable electronic device 22, requires updating. Thus, data records in which changes have been made at the communication system 20 that are not reflected in the corresponding data records at the portable electronic device 22, are determined by the comparison at step 202. These data records are then transmitted to the Portable electronic device at step 204.

The data records are received at the Portable electronic device at step 206 and the second subscriber's Calendar data records of the database 40 at the portable electronic device 22 are updated at step 208. In the present example, the second subscriber provided read-only access to the Calendar data records and thus, the records on the portable electronic device are updated to match the Calendar data records on the database 34B. The Calendar data records on the database 34B are not changed during this synchronization, however.

It will be understood that the above description relates to one example of a method and apparatus for subscribable folder synchronization and management. Many modifications and variations are possible. For example, in the above description, the second subscriber provided read-only permission for the first subscriber to access the personal Calendar data records of the second subscriber. It is possible, however, that the second subscriber provides complete read and write access to their personal Calendar data records. In this case, the data records received at the portable electronic device 22 of the first subscriber can be modified, deleted or further data records can be added by the first subscriber. Further, upon synchronization with the communication system 20, as described with reference to FIG. 10, the data records stored in the database 34B at the communication system are updated to reflect updates and changes made at the portable electronic device 22. With the determination of a mismatch, a conflict resolution policy is run, thereby determining how the mismatched data records are to be updated (i.e. whether to update the database records on the portable electronic device 22 with the database records of the synchronization server 30 or vice versa).

Although the above examples have been described with reference to the Calendar data records, permission can be indicated to provide delegate access to other data records such as Messages, Address Book, Tasks and Memo Pad data records. As indicated above, the data records for each of the applications includes an extension that provides a unique identification, thereby identifying the data record as belonging to a particular folder (Messages, Address Book, Tasks, Memo Pad or Calendar). For each of the data records of the applications, the extension also provides an identification of the data source, referred to herein as the data source identification. Thus, the data records that originate from another subscriber and that are synchronized to the portable electronic device 22 by permissions set by the originating user are differentiated by the unique identification, identifying the data source.

Although only two subscribers are described in the examples above, further subscribers can make their data records available to the first subscriber such that the first subscriber is permitted delegate access to data records from more than one other subscriber. In the event that the first subscriber is permitted delegate access to Calendar data records, for example, from more than one other subscriber and the first subscriber synchronizes each folder to which they are provided delegate access, to their portable electronic device 22, more than one other subscriber is listed for access on the LCD display output device 56 for access. Thus, in the exemplary screen shown in FIG. 9, further names of other subscribers are listed under the heading Delegate Calendars.

Also, delegate access has been described herein. It is also possible that access is provided to public folders of the Messages, Address Book, Tasks, Memo Pad or Calendar applications. For each of the data records of the applications, an extension provides an identification of the data source, referred to herein as the data source identification, as in the examples described above. In the case of public folders, however, the data source identified is unique to that public folder. Thus, the data records from that folder are uniquely identified as belonging to that folder and are differentiated from other personal and delegate data records by the unique identification. The owner of a public folder modifies permissions to provide public access and notifies those that are granted access to the public folder in a similar manner to that described above with reference to FIG. 6. The public folder is synchronized to the portable electronic device 22 by first finding the owner (subscriber) and viewing shared folders as described above. Public folders can be viewed on the LCD display screen separate from personal and delegate folders. Thus, in the exemplary screen shown in FIG. 9, a further heading of Public Calendars is provided, under which the public folder is identified by the public group, for example.

Although all the data from personal folders is synchronized to the portable electronic device, it is contemplated that the data synchronized to the device from delegate or public folders can be limited. For example, Calendar data records can be limited to a period of, for example, two weeks. Messages, Tasks and Memo Pad data records can be limited to those added to the public folder within a period of time, for example, two weeks. Further, data synchronized to the portable electronic device can be limited to key fields of data or can be limited to fields of interest such as title only for Memo Pad data records, title, due date, and recurrence information for Tasks data records, subject, location, time and recurrence data for Calendar data records, and titles only for Messages data records.

While the portable electronic device 22 is synchronized to the communication system 20, the portable electronic device 22 can also be synchronized to a desktop computer by wire connection, for example. It is contemplated that only the data records from the subscriber's personal database folders are synchronized with the desktop computer. For example, the unique identification identifying the folder to which the data record belongs and the data source, can be used to differentiate the folders and to keep those folders that do not belong to the subscriber's personal data records from being synchronized to the desktop computer.

Thus, according to one aspect, there is provided a method of sharing data accessible by a server, with a portable electronic device of a first entity. The method includes receiving permission at the server to share with the first entity, data associated with a second entity, the data for use with an application. The server retrieves the data associated with the second entity and transmits the data from the server to the portable electronic device of the first entity. The data associated with the second entity is received at the portable electronic device of the first entity and stored in association with a second entity identifier, thereby distinguishing the data from other data for use with the application.

According to another aspect, there is provided a server method for sharing data with a portable electronic device of a first entity. The method includes: receiving permission at the server to share with the first entity, data associated with a second entity, the data for use with an application; retrieving the data associated with the second entity; and transmitting the data to the portable electronic device of the first entity.

According to another aspect, there is provided a system for data management suitable for sharing data with a portable electronic device of a first entity. The system includes: a memory device for storing data associated with a second entity, the data for use with an application; a processor connected to the memory device for receiving permission to share the data associated with the second entity and for retrieving the data from the folder associated with the second entity; and a transmitter for transmitting the data to the portable electronic device of the first entity.

According to another aspect, there is provided a computer-readable medium having computer-readable code embodied therein. The computer-readable code is executable by a processor for: receiving permission at a server to share with a first entity, data associated with a second entity, the data for use with an application; retrieving the data associated with the second entity; and transmitting via over-the-air transmission, the data to a portable electronic device of the first entity.

According to still another aspect, there is provided a method of management of shared data at a portable electronic device of a first entity. The method includes: receiving data associated with a second entity at the portable electronic device of the first entity, the data for use with an application; and storing the data in association with a second entity identifier, thereby distinguishing the data from other data for use with the application.

According to yet another aspect, there is provided a portable electronic device of a first entity. The portable electronic device includes: a receiver for receiving data associated with a second entity, the data for use with an application; a memory device for storage of the data; and a processor connected to the memory device for storing the data in association with a second entity identifier, thereby distinguishing the data from other data for use with the application.

According to another aspect, there is provided a computer-readable medium having computer-readable code embodied therein. The computer-readable code is executable by a processor for: receiving data associated with a second entity at a portable electronic device of a first entity, the data for use with an application; and storing the data in association with a second entity identifier, thereby distinguishing the data from other data for use with the application.

Advantageously, synchronization and storage of data records of a single application type to the portable electronic device is possible for data records from multiple folders at different databases. Thus, multiple Calendar folders can be synchronized to the portable electronic device from databases associated with different subscribers. This is useful, for example, for an assistant to access the Calendar data records of his/her employer or boss. The assistant is then able to view the Calendar data records, and if permission is granted, add, modify or delete Calendar data records. Similarly, multiple Messages, Address Book, Tasks and Memo Pad data records can be synchronized to the portable electronic device. The multiple folders are kept separate and distinct rather than merging into a single folder on the device.

While the embodiments described above are directed to particular implementations of the method and apparatus for folder synchronization and management, it will be understood that modifications and variations to these embodiments are within the sphere and scope of the present application. For example, current Messages (e-mail) applications support more than one folder within the application. It is contemplated that data records from the Messages application that are provided by way of delegate access permitted by other subscribers or public messages can be stored in folders accessible within the Messages application such that when the Messages application is executed, additional folders containing these records are displayed. For example, current Messages applications support display of several folders such as Inbox, Sent Items and Deleted Items. Further folders such as delegate and public messages folders, containing these data records can be displayed on the same screen, permitting access to any of the data records.

Still other modifications and variations are possible. For example, the screens of the LCD display output device shown in FIGS. 4, 7A to 7C and 9 are provided for exemplary purposes only. Other screen views and layouts are possible. It will also be understood that the steps described hereinabove are not limited to the order in which they are described. The steps described can be performed in any suitable order as may occur to those skilled in the art. Further, it will be understood that the portable electronic device 22 is not limited to three databases as any suitable number of databases is possible. Similarly, the communication system 20 may include any suitable number of databases.

Many other modifications and variations may occur to those skilled in the art. All such modifications and variations are believed to be within the sphere and scope of the present application.

The invention claimed is:

1. A method comprising:
storing in a memory of a portable electronic device a first database having a first group of data records associated with a calendar application;
receiving an indication at the portable electronic device that a second database is being shared by a server, the second database having a second group of data records associated with the calendar application;
distinctly identifying the first group of data records from the second group of data records with an identifier;
responsive to determining that no folder stored on the memory of the portable electronic device is associated with second group of data records, transmitting to the server an initialize command identifying the second database;
in response to transmitting the initialize command, receiving the second group of data records; and
storing the second group of data records and the associated identifier in the memory of the portable electronic device.

2. The method of claim 1, wherein the data records associated with the first group have a first identifier associated with the first database and wherein the data records associated with the second group have a second identifier associated with the second database.

3. The method of claim 2, wherein each data record of the first group of data records is stored in a first folder associated with the first group and each data record of the second group of data records is stored in a second folder associated with the second group.

4. The method of claim 2, further comprising:
receiving a selection indicating one of the first group of data records and the second group of data records; and
in response to the selection, respectively displaying the first group of data records or the second group of data records.

5. The method of claim 2, further comprising:
receiving a selection indicating one of the first group of data records and the second group of data records; and
in response to the selection, respectively synchronizing the first group of data records or the second group of data records.

6. The method of claim 1, wherein at least one data record associated with the calendar application is one of an appointment a meeting, or a dinner.

7. The method of claim 1, further comprising receiving a list of shared databases.

8. A portable electronic device comprising:
memory storing a first database having a first group of data records associated with a calendar application; and
a receiver configured to receive an indication that a second database is being shared by a server, the second database having a second group of data records associated with the calendar application;
a transmitter configured to transmit data to the server; and
a processor coupled to the memory, the processor configured to:
distinctly identify the first group of data records from the second group of data records with an identifier
responsive to determining that no folder stored on the memory of the portable electronic device is associated with the second group of data records, cause the transmitter to transmit to the server an initialize command identifying the second database; and
in response to the transmitter transmitting the initialize command, receive the second group of data records; and
cause the memory to store the second group of data records and the associated identifier.

9. The portable electronic device of claim 8, wherein the data records associated with the first group have a first identifier associated with the first database and wherein the data records associated with the second group have a second identifier associated with the second database.

10. The portable electronic device of claim 9, wherein each data record of the first group of data records is stored in a first folder associated with the first group and each data record of the second group of data records is stored in a second folder associated with the second group.

11. The portable electronic device of claim 9, wherein the processor is further configured to:
receive a selection indicating one of the first group of data records and the second group of data records; and
in response to the selection, respectively display the first group of data records or the second group of data records.

12. The portable electronic device of claim 9, wherein the processor is further configured to:
receive a selection indicating one of the first group of data records and the second group of data records; and
in response to the selection respectively synchronize the first group of data records or the second group of data records.

13. The portable electronic device of claim 8, wherein at least one data record associated with the calendar application is one of an appointment, a meeting, or a dinner.

14. The portable electronic device of claim 8, wherein the receiver is further configured to receive a list of shared databases.

15. A computer program product, comprising a computer usable medium having a computer readable program code adapted to be executed to implement a method comprising:
   storing in a memory of a portable electronic device a first database having a first group of data records associated with a calendar application;
   receiving an indication at the portable electronic device that a second database is being shared by a server, the second database having a second group of data records associated with the calendar application;
   distinctly identifying the first group of data records from the second group of data records with an identifier;
   responsive to determining that no folder stored on the memory of the portable electronic device is associated with the second group of data records, transmitting to the server an initialize command identifying the second database;
   in response to transmitting the initialize command, receiving the second group of data records; and
   storing the second group of data records and the associated identifier in the memory of the portable electronic device.

16. The computer program product of claim 15, wherein the data records associated with the first group have a first identifier associated with the first database and wherein the data records associated with the second group have a second identifier associated with the second database.

17. The computer program product of claim 16, further comprising:
   receiving a selection indicating one of the first group of data records and the second group of data records; and
   in response to the selection respectively displaying the first group of data records or the second group of data records.

* * * * *